US 9,818,565 B2

(12) United States Patent
Deck et al.

(10) Patent No.: US 9,818,565 B2
(45) Date of Patent: Nov. 14, 2017

(54) HUMAN-MACHINE INTERFACE FOR A SELF-SUPPLIED RELAY

(71) Applicant: ABB TECHNOLOGY LTD, Zurich (CH)

(72) Inventors: Bernhard Deck, Weilheim (DE); Vijay Shah, Gujarat (IN); Indresh Bhatia, Vadodara (IN); Jatin Parmar, Gujarat (IN); Niraj Suthar, Gujarat (IN)

(73) Assignee: ABB Schweiz AG, Baden (CH)

( * ) Notice: Subject to any disclaimer, the term of this patent is extended or adjusted under 35 U.S.C. 154(b) by 455 days.

(21) Appl. No.: 13/872,558

(22) Filed: Apr. 29, 2013

(65) Prior Publication Data

US 2013/0235503 A1   Sep. 12, 2013

Related U.S. Application Data

(63) Continuation of application No. PCT/IB2011/002314, filed on Oct. 3, 2011.

(30) Foreign Application Priority Data

Oct. 28, 2010  (IN) .......................... 3214/CHE/2010

(51) Int. Cl.
*H01H 47/02* (2006.01)
*H01H 71/12* (2006.01)
*H01H 71/74* (2006.01)
*H01H 71/00* (2006.01)
*H02H 3/00* (2006.01)

(52) U.S. Cl.
CPC .......... *H01H 47/02* (2013.01); *H01H 71/123* (2013.01); *H01H 71/74* (2013.01); *H01H 2071/006* (2013.01); *H02H 3/006* (2013.01)

(58) Field of Classification Search
CPC ...... H01H 47/02; H01H 71/123; H01H 71/74; H02H 3/006
See application file for complete search history.

(56) References Cited

U.S. PATENT DOCUMENTS

| 6,330,142 | B1 | 12/2001 | Bellotto et al. |
| 6,741,442 | B1* | 5/2004 | McNally et al. ............. 361/166 |
| 7,105,947 | B1* | 9/2006 | Marshall et al. ............... 307/28 |

(Continued)

FOREIGN PATENT DOCUMENTS

| EP | 1 005 130 A1 | 5/2000 |
| EP | 2068336 | * 10/2009 |

(Continued)

OTHER PUBLICATIONS

International Search Report (PCT/ISA/210) dated Jan. 31, 2012, by the Indian Patent Office as the International Searching Authority for International Application No. PCT/IB2011/002314.

*Primary Examiner* — Zeev V Kitov
(74) *Attorney, Agent, or Firm* — Barnes & Thornburg LLP

(57) ABSTRACT

A design of a protection relay, and interface with an operator of a protection relay, are disclosed. The protection relay can include a base relay for measurement of line current and for generation of a trip signal, a base Human Machine Interface (HMI) for user specifying of a base setting of an operating parameter of the protection relay, and an optionally active Human Machine Interface (HMI) unit having a processing unit to manage plural activities with controlled power consumption.

20 Claims, 1 Drawing Sheet

(56) References Cited

U.S. PATENT DOCUMENTS

2009/0281740 A1    11/2009   Stoupis et al.
2010/0296221 A1    11/2010   Shah et al.
2011/0025515 A1     2/2011   Suthar et al.

FOREIGN PATENT DOCUMENTS

WO    WO 2009/071454 A1   6/2009
WO    WO 2009/101463 A1   8/2009

\* cited by examiner

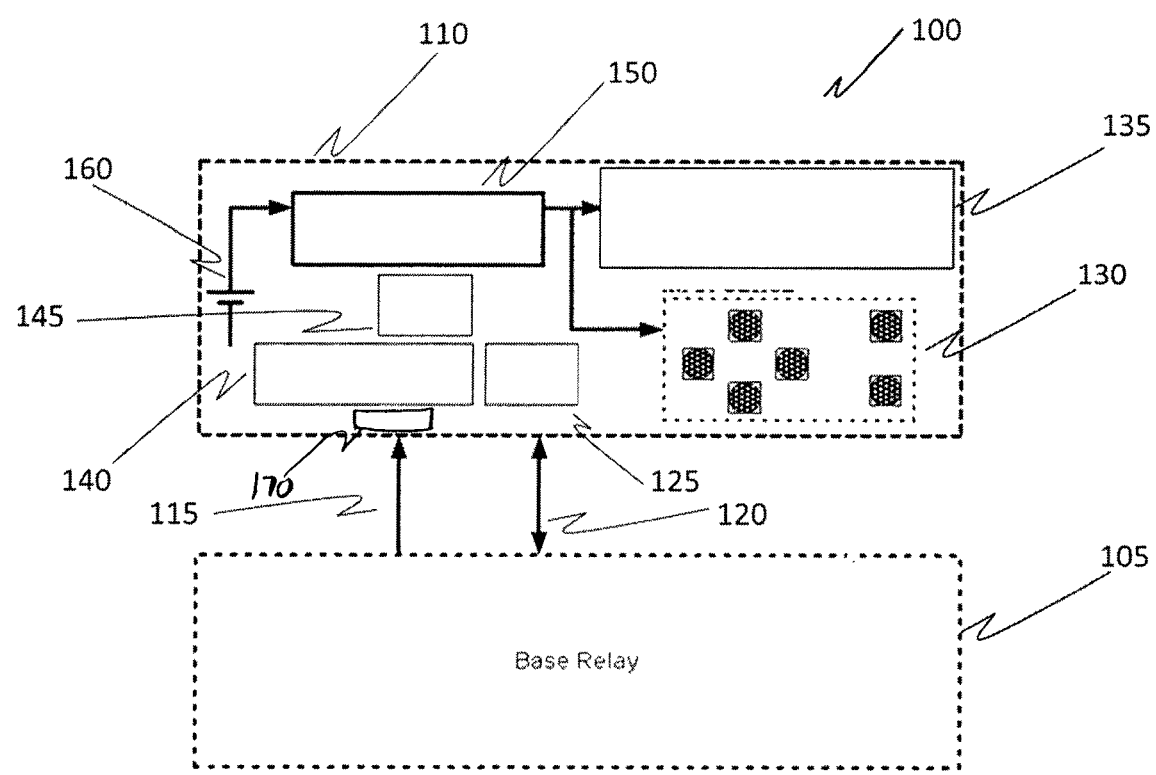

HUMAN-MACHINE INTERFACE FOR A SELF-SUPPLIED RELAY

RELATED APPLICATION

This application claims priority as a continuation application under 35 U.S.C. §120 to PCT/IB2011/002314, which was filed as an International Application on Oct. 3, 2011 designating the U.S., and which claims priority to Indian Application 3214/CHE/2010 filed in India on Oct. 28, 2010. The entire contents of these applications are hereby incorporated by reference in their entireties.

FIELD

The present disclosure relates to the field of electrical power distribution, such as the design and interface of a protection relay with an operator of the protection relay.

BACKGROUND

A protection relay is a microcontroller based intelligent electronic device with a basic function to protect electrical equipment by tripping a circuit breaker and interrupting a power line in case of over current or earth fault situations. The tripping signal on behalf of a trip coil or other actuator of the circuit breaker can be generated by the protection relay when, for example, the measured current in the line exceeds a nominal or preset value for a predefined time period. In certain situations such as Ring Main Unit (RMU) installations in urban areas, a self-supplied relay may for example be used. The self-supplied protection relay utilizes energy from the current sensing transformers to supply power to the relay electronics circuit and to supply energy to operate trip coils. The design of a self-supplied relay can have several constraints associated with it to ensure that the measurements are accurate and sensitive, and that its circuitry is efficient and optimized for power consumption. Some of these constraints and methods to generate power supply by controlled charging are disclosed in the WIPO publication WO 2009101463.

A self-supplied relay may be customized by a user through mechanical binary or Dual In-line Package (DIP) switches for parameter setting, or alternatively through battery-power alphanumeric LCD based Human Machine Interfaces (HMI). The HMI may be a detachable component as disclosed in the WIPO publication WO2009071454. The detachable HMI offers greater flexibility for the user in adaptation, configuration and display.

The DIP switches based HMI has limited functionality, restricted for example to binary combinations achievable for given DIP positions, apart from the constraints that a user has to do for decoding the switch position through a table to understand the interpretation of switch positions with respect to functionality being configured.

An HMI having features such as using push buttons or a touch screen interface can enhance the primary function of the product through an interactive user interface by displaying the various parameters of the relay including the line current measurements, protection settings, Event logs, and so forth. Such a HMI can also facilitate fine tuning of the achievable settings through given DIP combinations.

As one may recognize, a presence of a HMI can increase the scope of interaction that is possible with the relay and therefore the design of the HMI should be capable for scaling and support of functionality as desired for effective operation and configuration. This makes the design of such a HMI for a protection relay non trivial and specifically, for the self-powered relay, it involves optimized design for power supply and utilization (e.g., includes processing of information for display) to enable functions of the HMI even at trip conditions for the purposes of relay configuration and display of information.

SUMMARY

Exemplary embodiments are directed to a protection relay for providing electrical protection in an electrical system, the protection relay comprising: a base relay for measurement of line current and for generation of a trip signal; a base Human Machine Interface (HMI) for allowing a user to specify a base setting of an operating parameter of the protection relay; and an optionally active Human Machine Interface (HMI) unit having processing unit to manage plural activities with controlled power consumption wherein the protection relay is configured to accommodate the optionally active HMI unit.

BRIEF DESCRIPTION OF THE DRAWINGS

Other features and advantages will become apparent to those skilled in the art upon reading the description of preferred exemplary embodiments in conjunction with the accompanying drawing, wherein:

FIG. 1 is a protection relay as per an exemplary embodiment disclosed herein.

DETAILED DESCRIPTION

As disclosed herein, exemplary embodiments can increase the flexibility in the use of a protective relay. This can be achieved by providing a suitable design for a Human Machine Interface for a protective relay, such as a self-powered relay that receives power from the line to which it is connected.

In one exemplary embodiment, a protection relay for providing electrical protection in an electrical system is provided. An exemplary protection relay comprises a base relay for measurement of line current and generation of a trip signal, a base Human Machine Interface (HMI) for specifying a base setting of an operating parameter of the protection relay by an user, and an optional Human Machine Interface (HMI) unit.

In an exemplary embodiment, the protection relay is adapted to accommodate an optional HMI unit that is detachable and comprises a processing unit to manage a plurality of activities with controlled power consumption. The optional HMI can manage power consumption for itself and also supports controlled charging from the base relay such that the power consumption can be minimized as much as possible to carry out relay functions. The processing unit can comprise a dedicated controller, dedicated memory, power circuitry for charging and supplying battery/base relay optimally, a display device and an input device. The processing unit can also function as a supervisory unit to determine and control health of various components and functions, specifically, power management.

In another exemplary embodiment, the protection relay is provided with settings for its operations by setting of various operating parameters through the optional HMI unit. The provision to set operational parameters is access controlled (e.g., it is designed to provide read only access or access for editing the parameters based on interface inputs).

In another embodiment, the optional HMI is used for display of stored information. The stored information includes configurations, settings, event logs with time stamps, battery status, and so forth. The HMI unit also displays processed information such as alerts, internal relay failure messages, ammeter readings, information for operator and so forth.

In another exemplary embodiment, the optional HMI is provided with an integrated device such as touch screen to serve both as a display device and as an input device.

In yet another exemplary embodiment, the optional HMI is provided with a means to boot up with a power supply from the base relay or from a battery provided for the power supply purpose in the protection relay, establish or attempt communication with the base relay, and function accordingly as a HMI for an operator for information and configuration/settings.

For the purpose of this disclosure, the HMI component is referred to as a HMI unit or simply a HMI and the relay is referred to as a Base relay.

A suitable design is also disclosed for a touch screen based HMI for a self-powered relay, the relay supporting a detachable feature for the HMI. Further, the touch screen based HMI can be provided with the relays already having a display device (LCD) and input devices (for example: membrane type buttons) with minimal change in the hardware circuitry (such as the signal interfaces) in the base relay for the HMI unit and corresponding changes in the firmware/software associated with the base relay.

The DIP switches based HMI can have limited functionality (e.g., restricted to binary combinations achievable for given DIP positions), apart from the constraints that a user is to perform for decoding the switch position through a table to understand the interpretation of switch positions with respect to functionality being configured. The HMI with touch screen interface can enhance the primary function of the product through an interactive user interface by displaying the various parameters of the relay including the line current measurements, protection settings, Event logs, and so forth. This also can facilitate fine tuning of the achievable settings through given DIP combinations.

An exemplary embodiment can achieve this through an HMI unit, for example with a 128*64 pixel resolution Graphic LCD to display the data, and resistive matrix type touch screen to accept the commands from the user for navigating through the menu screens. The touch screen may be configured with known LCDs with push buttons, even when used with membrane type buttons integrated with the overlay, to reduce the size of the design which may otherwise not be effective sizewise and costwise. For the HMI, the input device and the display device both are involved and can consume considerable space.

As illustrative examples for HMI, the following examples may be considered.

The display may be used to interact about relay configurations through various predefined HMI controls and buttons, turn ON and turn OFF HMI, view CT (current transformer) type, earth fault type, other failure (eg communication) information, view/manage/change/reset/confirm settings, records and events. It may also be used to receive information to complete configurations or confirm configurations and to acknowledge various settings or states (e.g., low battery indication). As one would recognize, a presence of a HMI can increase the scope of interaction that is possible with the relay and therefore the design of the HMI should be capable for scaling and support of functionality as desired for effective operation and configuration.

Further, the relay may be Turned ON with options for turn on using Battery (offline normal operation), turn on using relay power (online normal operation) or turn on using Battery (offline with previous fault) and turn on with Relay Power (online with previous event) provided as a selectable menu operation in a single screen.

As another example, one could have a configuration (e.g., a particular DIP switch setting) confirmed or obtained through an HMI option (referred to as "Is information" in the design used for the HMI unit) to confirm if a CT is selected or to obtain the desired information associated with the DIP switch setting.

The HMI can offer multiple effective user interface options to the user to intuitively configure or navigate through the options provided by the relay using a menu based model or otherwise be associated with configuration and operation of the relay.

FIG. 1 provides an exemplary system block diagram for the protection relay 100. The block diagram contains a base relay 105, a detachable HMI 110, power supply interface 115 and communication interface 120. Further, the HMI contains (e.g., consists of) standard communication interface module 125 (e.g., RS232), HMI input device 130, display device 135 (input device and display device may be integrated as, for example, a touch screen), a dedicated microcontroller 140 having a dedicated memory 145 for recording various HMI configurations (e.g., screens, navigations, and so forth). Further, the HMI can include a power circuitry 150 for battery/base relay power management. The HMI provides for an electrical interface to the battery 160 and optionally, the battery may be an integral part of the HMI.

The system has, for example, an advantage that the signals for an interface are minimal and no major hardware or interface is required between the base relay and the HMI unit.

In this option, apart from advantages in terms of interface, with less number of interconnects between HMI and Base relay, where an RS232 communication interface is used the configuration can be limited with only the data lines, and no hardware Handshake signal between the 2 micro controllers (HMI microcontroller and the base relay microcontroller), and hence in such a case an additional firmware can be provided to establish proper handshake between the controllers (this can help in error free communication exchange between base relay and HMI). The relay information may be exchanged regularly using the polling or interrupt driven mode triggered from the base relay.

Also, with an additional micro controller on the HMI, it adds its own power consumption load, on both, the base relay while the base relay is energized and also on the battery, while in the battery mode of operation. In microcontrollers, the operating frequency dictates the basic power consumption, and the consumption pattern can be important for the microcontroller used in the HMI design at different operating frequencies. The HMI controller should be operated on a minimum possible frequency to save power (e.g., 10MHz). This can increase the load on the firmware of the HMI to handle the operations at this operating frequency, however, since the baud rate for the communication between the HMI and base relay is not expected to be at loss, and low frequency operation of the microcontroller may be acceptable levels, for 9600 baud.

Apart from the operating frequencies, there can also be other power saving modes supported by the microcontroller that may be implemented through the Firmware, such as selective powering of the peripherals in the micro controller.

If we consider an option without the memory device on the HMI, once the power fails in the base relay, the HMI module shall have no information to display (in terms of events/data log and so forth) and this shall not serve the intended purpose of the HMI, (to view the settings/events/data logs when the base relay is not energized). Therefore, in addition, a memory of the HMI unit may be provided as a dedicated memory for the HMI, or the memory in the base relay may be used.

The memory used in the base relay can be interfaced with the micro controller on an I2C communication interface, (e.g., standard two wire communication protocol and interface for inter-communication between the devices). To access the memory of the base relay through the microcontroller of the HMI module, the interface pins of the memory can be brought out. And since, the HMI and base relay are two separate modules, connected via a custom interconnect, these pins of the I2C can be brought out and made accessible to the HMI microcontroller, exposing the TTL level (e.g., 0-3.3V high frequency (300 KHz)) signals outside the motherboard of the base relay, and this is not a feasible (good) design option as these lines warrant special attention in terms of track lengths and other layout considerations for healthy communication.

Another option in this case is to also energize the microcontroller and the memory section of the base relay itself by battery power, and then establish the communication between the microcontrollers of the base relay and the HMI. The base relay microcontroller then accesses the information from the memory and communicates the same to the HMI. However, in this case, there can be an extra burden on the battery, to energize two microcontrollers of the HMI and the base relay, and this load can be supported by the battery.

As an exemplary embodiment, the memory device may be provided on the HMI module itself, so that the information, (as and when generated) can be stored in the base relay memory and communicated to the HMI microcontroller, and can be stored in the HMI memory also. And once the base relay is powered down, and the user wishes to read back the data, only the HMI is energized and the microcontroller reads the data from the memory and shows the same to the user. It is also helpful in saving changes done by the user on operational setting parameters, for storing in the same memory, thus providing the possibility to update the parameters in the off-line mode when the HMI is powered through battery.

As an example, the HMI can store the trip information (e.g., five numbers) with the following details:
  Trip Stage: I>,I>>,Io>,Io>>
  CT and Earth type information during the trip with Is Settings.
  Line and Earth current at the instant of trip
  Line and Earth current at 20 ms and 40 ms before trip
  Time and date stamping The events can be stored with the HMI in five separate memory locations with its time stamp. It can also store Protection Start, DIP switch change and IRF (Internal Relay Failure) as separate events.

A user can then view data of the Base relay by deriving the power through the Base Relay whenever there is sufficient power available in the Base Relay, and when the power is not available through the Base relay, the HMI can derive power through a Battery and perform functions as desired, so as to minimize the battery drain when the power is already available in the Base Relay, and to facilitate the functionality at the loss of power in the Base Relay.

Usage of touch screen technology for the user interface differentiates the product from other known keypad technologies which have been getting deployed in other IEDs in active use. This feature can act as a strong differentiator and bring considerable ease for the user who wants to interact with the relay.

The HMI unit can be designed with a separate processor and have the functionality of only communicating the data with the main processor that is present on the base relay on a serial interface. Hence the measurement/protection and other critical functionality of the base processor can be isolated from the functionality of the HMI, since both have their own dedicated processors.

The HMI unit can be operated with dual power (e.g., when the relay is powered ON through CT, the HMI (processor, LCD, Touch screen and all other electronics) receive the same power from the relay, and when the relay is turned OFF, the HMI can be turned ON through the battery, by pressing a specific zone on the touch screen (e.g., a WAKE-UP zone) and also in this mode the HMI can be turned OFF by pressing the same zone on the touch screen to save the battery power.

The HMI can also be turned OFF automatically if there is no activity by the user (e.g., in terms of navigating on the Touch Screen) for a period of five minutes, as an example.

The HMI can load the battery only when the power from CT is not available and the user invokes the HMI through the power-on zone from the touch screen. However, the functions can be the same from the HMI, whether it is powered ON through the CT or through Battery, such that a functionality is reduced in the battery mode of operation. The battery can be mounted within a compartment provided in the base relay itself and can be connected to an interconnect provided on the base relay. The battery used, as an example, is made of Lithium-Manganese Dioxide type (LiMnO2) composition.

The basic screens for each functions can be stored in an internal Flash Memory of the micro controller, and the run time user inputs stored, for example, in an FeRAM—FerroElectric NonVolatile RAM (this is a memory device that is non-volatile, however, the operating speed and power consumption is like a volatile memory, the operating speed and power consumption of a volatile memory, like a RAM, is lower than that of a non-volatile memory like an EEPROM)

The battery supply can be boosted up by an internal Boost Converter in the HMI unit to supply a regulated 3.3V to the HMI. A threshold detection can provide an alert for Low Battery to the user on an LCD when the battery voltage falls to 2V. In an exemplary embodiment, this alert can remain on screen (even at startup if the battery voltage is sensed to be lower than the limit) and during this alert, no other screen shall be displayed and the user shall not be able to navigate further. However, there is an acknowledge button which, if the user presses, (the Enter button on Touch screen), the user can go inside the menu navigation.

As an exemplary embodiment, the HMI unit may be programmed to serve the purpose of fine settings, event data storage, trip data logs and ammeter function with provision to display both nominal currents and primary currents depending on the CT selection. Further, the HMI unit may be programmed to have a default display (e.g., an Ammeter function when no menu navigation is being performed). Suitable provision may be used with the HMI unit to have backlight for better data readability in a dark environment. In addition, the HMI unit may be provided with on-chip RTC (real time clock) module with battery backup for time stamping (e.g., records of last 5 event information with time stamp).

As further exemplary embodiments for event data storage and trip data logging, the HMI may be programmed to record the last five Trip data currents with time stamp with data logs of currents (e.g., 20 ms and 40 ms before trip). The HMI may be programmed to store information of the last Relay Settings change with time stamps and also made to support user settable inrush parameter settings. Further the design of the HMI unit can include a watchdog supervisory circuit 170 to monitor controller health and to ensure proper power supply to controller.

In yet another exemplary embodiment for the programmable aspect of the HMI unit, the HMI with touch panel and LCD, can be used to view the settings and event and data records, protected in terms of its accessibility by the user. Two different modes for viewing and editing can be implemented with different ways of using keys.

Read or edit modes can be defined for the HMI operation during menu navigation. All menu options and settings are always visible. The user session can be Read only session. The user can enter a menu navigation by pressing an ENTER/OK key in the default screen. The user can navigate to all menu screens to view the various menu items and settings. This means that the settings cannot be edited or changed in this mode. The edit mode access enables changing of relay settings and HMI parameters. An extended press of the ENTER key can be entered in any editable screen to edit the parameter.

The following exemplary parameters are editable:
Relay fine settings
CT type settings
Time settings
Erase the stored data from Records
Erase the stored fine settings
Edit inrush settings
Ammeter unit On extended press of ENTER key, the read mode can automatically be changed to the edit mode. Once in the edit mode, parameters can be changed. Once a desired parameter value is selected by the UP/DOWN keys, the Enter key sets the value and saves the value in RAM of HMI. In special parameters changes, (e.g., CT type change through menu navigation), an acknowledgement can also be given as a separate screen. On saving the parameter, the Edit mode is changed back to the read mode. If there is no activity on the keyboard for 1 minute in the Edit Mode, the Edit mode can be forcefully closed and the read mode will be resumed without affecting the previous settings or parameters (e.g., no revised settings will be applicable).

Further, as exemplary embodiments, specific operations of the relay are provided below:

HMI Boot Up Sequence—

The HMI can be powered up through the base relay and battery. If powered through the base relay, it communicates to identify the base relay software version to which it behaves. The HMI checks its power source on boot up. The HMI does not communicate to the base relay when powered up through the Battery. The boot sequence is completed without any communication fault. The Ammeter display shows no current values. The HMI shows the last saved settings of the relay. Changes in finer settings are saved in the HMI, and on next power up from base relay, they are transmitted to the Base relay if there is no change in the DIP settings. A check can be done at periodic intervals in the HMI when powered from battery for availability of base power and resume the communication with the base relay. In case the HMI receives no response to its requests in a specified time, the communication failure is declared. The HMI attempts to connect to the base relay even after the communication failure.

Events and Trip Data Logs—

After intimation of a trip event from the base relay, the HMI enables the battery power circuit. In case of power off from base relay; the battery will ensure faithful data storage if data has been transferred to the HMI. If communication fails after the trip event, no data will be stored. In case of low battery or no battery, data storage is not guaranteed. After faithful storage of all data received from the base relay into non-volatile RAM of the HMI, the HMI will disable the battery power circuit.

The events occur in the Base relay. The events communicated to the HMI are to be recorded. When the HMI receives a correct event data, it adds a time stamp to the event before storage. All events are time stamped with details of date of occurrence and time of occurrence up to seconds. No time stamping is done for Data logs. Thus the Communication link becomes critical. No data is recorded if the base—HMI communication link fails.

Information in the Trip Records—

The HMI stores trip information with the following exemplary details:
Trip Stage: $I>,I>>,Io>,Io>>$
CT and Earth type information during the trip with Is Settings.
Line and Earth current at the instant of trip
Line and Earth current at 20 ms and 40 ms before trip
Time and date stamping Any new entry of fault record will push existing records down, deleting the last entry.

Event Records—

The following exemplary events are stored with the HMI in 5 separate memory location with its time stamp:
Protection Block (Inrush)
Binary Input Event The Protection Start event is not part of the event record database but given as an alert for user information with its time stamp.

Similarly the DIP change is recorded as an event and stored separately along with its timestamp.

The last IRF (internal relay failure) recorded is also stored with a time stamp.

HMI Fine Settings—

The base relay is provided with limited settings through DIP switches. HMI should be able to provide the fine settings to the coarse settings done by DIP switches.

Finer setting will be applicable in rolling fashion between two consecutive DIP settings. The setting can be changed in an edit mode by pressing either an up or down arrow on a touch pad navigation menu. While editing the finer settings, a corresponding base DIP setting will appear on the menu. In case of offline finer settings through HMI, the last image of a DIP setting will appear on menu.

HMI Alerts—

HMI when started should show some alerts and wait for the user to acknowledge. HMI upon its wakeup shows the following exemplary alerts, if any, with priority defined. The following alerts along with the condition for the alert are provided as examples:
HMI NvRAM IRF—HMI NvRAM is not readable or writable in 5 consecutive read/write attempts
BASE RELAY IRF—Base relay reports a IRF condition
Reports only if the communication is OK LOW/NO BATTERY—The Low battery condition and battery absence is sensed by the ADC pin CT NOT SELECTED—If the user deletes the settings of HMI or if there is no CT information in a fresh Relay TIME NOT SET—No battery to maintain RTC or first time setting of the RTC TRIP—Previous or current unread trip message NON TRIP EVENTS—All other intimations of events other than trip COMMUNICATION ERROR—No communication with the base relay for 5 attempts.

HMI Disabled—DIP for HMI Enabled/Disabled switched is in OFF position.

HMI Backlight Functionality—

The LCD screen of the HMI is provided with the backlight. Back light will turn ON at every wake up when powered through battery. Back light will be ON up to 1 minute after last key touch on HMI. During run time if the backlight is OFF then on any key press on the HMI area, the back light shall be ON for 1 minute after last key press. The HMI shall continue functioning for 5 minutes after last key press (backlight will be off after 1 minute from last key press) and then will turn OFF.

Date and Time (RTC)—

Time stamping is desired for the data records. Therefore, the HMI has a feature of a Real Time clock which is supported by the battery even if HMI is OFF. The RTC (Real Time Clock) is set to the local time (manually) during setup. The time and date settings can be changed after setup during normal run of the HMI from menu navigation. The user can also view the current HMI time and Date from the menu navigation.

The RTC will have the following exemplary information:

Time Information:

Hours (24 Hr Format only) [00 . . . 23]

Minutes [00 . . . 59]

Seconds [00 . . . 59]

Date Information (with Automatic Correction on Leap Year)

Day [01 . . . 31]

Month [01 . . . 12]

Year [2010 . . . 2099]

On receiving the Trip and Event record from the base relay, the HMI will save the Records with the "Instantaneous" time (the time at which HMI receives the data and is found correct). Only events and trip times are recorded. If the RTC is not configured, the records will be saved with, for example, 00/00/0000 date and 00:00:00 time stamps.

HMI IRF—

The HMI has self-supervision ability. It also displays the IRF codes of the base relay if the base relay is in energized condition.

HMI can display IRF codes from the base relay only if the HMI is powered through the base relay. HMI however can display its own IRF codes when powered through both battery and base relay.

Exemplary IRFs considered for the base relay are:

Relay EEPROM Failure

Relay Trip capacitor Voltage Failure

IRF's considered for HMI:

HMI NvRAM Failure

No HMI failure indications (LED) are provided on the base relay. All protection functions can be blocked on the base relay IRFs. Protection blocking can be self reset on recovery of a healthy condition from the IRF condition. The IRF indication (LED) on the base relay can be self reset on recovery of a healthy condition from the IRF condition.

Inrush Functionality—

Inrush settings for the relay can be done through the HMI. After HMI startup and startup of base relay and after communication between the two is established, the inrush settings can be uploaded to relay. The relay starts with a default inrush parameter set. Once successful communication is established with the relay, the HMI attempts to communicate the Inrush parameters set by the user.

Low Battery Indication—

HMI can indicate the strength and absence of a battery. If the battery becomes weak, there is a Low Battery Alert on screen. The user can clear the intimation by pressing the ENTER key. There would not be any alert message on battery health after this, but there can be an icon on the HMI Screen in, for example, a top middle area, to indicate that the battery is running low.

The low battery indication icon will continue until the battery supply is available before complete drain. On complete consumption of battery power, the battery will show a NO BATTERY Alert and the icon will also change to a No Battery Icon. The user can change the battery by removing the HMI and replacing the battery in the battery compartment with the fresh one.

The user is recommended to change the battery as soon as the low battery indication is given. The storage of event data and data logs are not guaranteed once the battery is below the threshold (after a low battery indication is active). However, this threshold is below the "low battery" voltage level. This may give some time to the user for reading important data.

In NO Battery conditions, the trip data cannot be guaranteed to be stored.

Wakeup Through Push Button—

The HMI is mounted on the base relay which has a protection of a transparent cover. A push button is provided so that the user can access through the HMI without opening the transparent cover. A user can use this push button to wake up the HMI to view the default screen. If at all there is some alert, then the HMI shows the alert upon its wakeup. The user can also directly navigate to the last recorded trip fault data by the press of the same push button. Once the navigation is complete, the user can switch off the HMI by pressing the power button for more than 3 seconds.

HMI Enable or Disable Function—

HMI functionalities can be disabled by a single DIP switch on the base relay. Whenever the DIP switch for HMI Disable/Enable is OFF, the default settings stored in the base relay are applicable for the protection function. The fine settings and the functionalities of the HMI come into existence only when the switch ON.

Ammeter Functionality—

HMI displays the online current measurements as a default screen. HMI displays the online measured current values. A user has the option of displaying the current in terms of 'Is' or absolute primary Amperes. The user can select the CT installed from the HMI menu navigation. Three phase current values and earth current values (external or internal) are displayed.

Only certain features of the invention have been specifically illustrated and described herein, many modifications and changes will be apparent to those skilled in the art. It is, therefore, to be understood that the appended claims are intended to cover all such modifications and changes as fall within the true spirit of the invention.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A protection relay for providing electrical protection in an electrical system, the protection relay comprising:
 a base relay for measurement of line current and for generation of a trip signal;
 a base Human Machine Interface (HMI) for allowing a user to specify a base setting of an operating parameter of the protection relay, wherein the base HMI comprises a base relay processor and a base relay memory; and
 a detachable HMI having a processing unit with an HMI processor and an HMI memory,
 wherein power for the detachable HMI is sourced from at least one of the base relay and a battery,
 wherein the base relay is configured (a) to store information generated in the base relay in the base relay memory and (b) to communicate the information to the HMI processor to store in the HMI memory for functioning of the detachable HMI when the detachable HMI is powered from the battery and when power is unavailable from the base relay; and
 wherein the detachable HMI is configured (a) to use the information from the HMI memory for functioning with power from the battery, (b) to check for availability of power from the base relay for the detachable HMI, and (c) to establish communication with the base relay based on the checking for availability of power from the base relay for the detachable HMI.

2. The protection relay of claim 1, wherein the protection relay is a self-supplied relay configured to generate power from a line current to which the relay is connected during operation for measurement or protection.

3. The protection relay of claim 1, wherein the detachable HMI is configured to manage power consumption in the detachable HMI.

4. The protection relay of claim 1, wherein the detachable HMI is configured to manage power consumption in the base relay.

5. The protection relay of claim 1, wherein the detachable HMI is configured for setting of the operating parameter via user access control for reading and editing.

6. The protection relay of claim 1, wherein the detachable HMI comprises:
 a display for stored or processed information of the protection relay.

7. The protection relay of claim 1, wherein the detachable HMI comprises:
 an input to receive information through a touch screen.

8. The protection relay of claim 1, wherein the processing unit comprises:
 a micro-controller;
 the HMI memory;
 power circuitry for battery/base relay power management;
 an interface module;
 a display device; and
 an input device.

9. The protection relay of claim 8, wherein the display device and input device are integrated into a common device.

10. The protection relay of claim 8, wherein the processing unit comprises:
 a watchdog supervisory circuit to ensure a proper supply of power.

11. The protection relay of claim 8, wherein the processing unit is configured to manage controlled or selective powering of processing unit components to minimize power consumption.

12. The protection relay of claim 1, wherein the detachable HMI is configured for self supervision to determine health of components and functions of the detachable HMI.

13. The protection relay of claim 1, wherein the processing unit is configured to energize the HMI processor and the HMI memory of the detachable HMI using battery power.

14. The protection relay of claim 13, wherein the processing unit is configured to establish communication between the HMI processor of the processing unit of the detachable HMI and the base relay processor of the base relay.

15. The protection relay of Claim 1, wherein the base relay processor of the base relay is configured to access information from the base relay memory for communication to the detachable HMI.

16. The protection relay of claim 1, wherein the detachable HMI determines its power source during boot-up.

17. The protection relay of claim 1, wherein the detachable HMI is configured to save changes in finer settings of the relay in the HMI memory when the detachable HMI is powered from the battery and to transmit the changes in the finer settings to the base relay when the detachable HMI is powered from the base relay.

18. The protection relay of claim 1, wherein the detachable HMI is configured to perform a periodic check for availability of power from the base relay to resume communication with the base relay when the power to the detachable HMI is sourced through the battery.

19. The protection relay of claim 1, wherein the information stored in the HMI memory is at least one of configurations, settings, event logs with time stamps, and battery status.

20. The protection relay of claim 1, wherein the detachable HMI is configured to provide fine settings to parameter settings made with the base HMI.

* * * * *